UNITED STATES PATENT OFFICE.

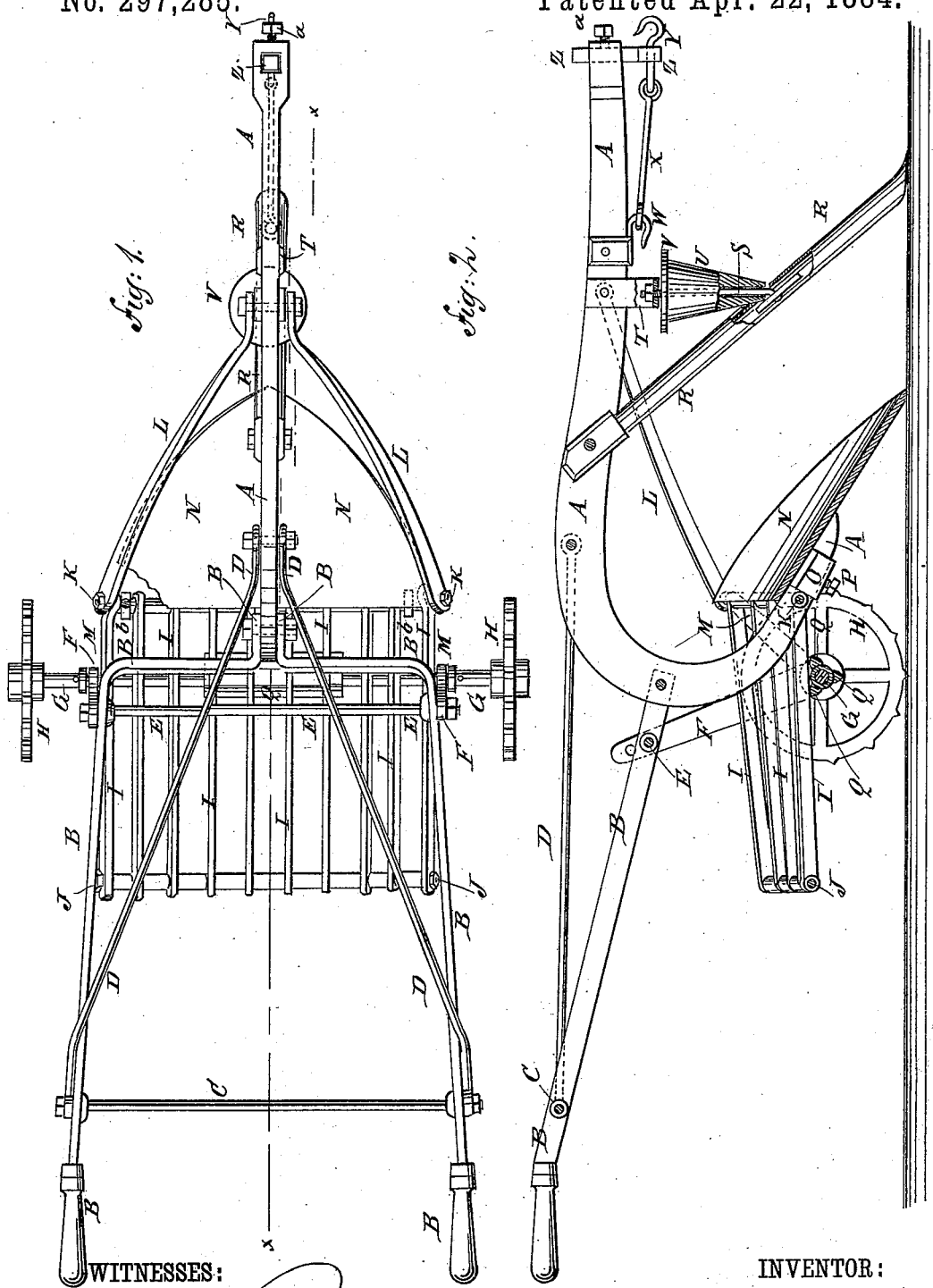

HANS NELSON, OF WAUPACA, WISCONSIN.

POTATO-DIGGER.

SPECIFICATION forming part of Letters Patent No. 297,285, dated April 22, 1884.

Application filed January 4, 1884. (No model.)

*To all whom it may concern:*

Be it known that I, HANS NELSON, of Waupaca, in the county of Waupaca and State of Wisconsin, have invented a new and useful Improvement in Potato-Diggers, of which the following is a full, clear, and exact description.

Reference is to be had to the accompanying drawings, forming a part of this specification, in which similar letters of reference indicate corresponding parts in both the figures.

Figure 1 is a plan view of my improvement. Fig. 2 is a sectional side elevation of the same, taken through the line $x\ x$, Fig. 1, parts being broken away.

The object of this invention is to facilitate the digging of potatoes, and also to promote convenience in adjusting and controlling potato-diggers.

The invention consists of the combinations of parts and their construction, substantially as hereinafter fully set forth, and pointed out in the claims.

A represents a beam similar to a plow-beam.

To the opposite sides of the bend of the beam A are bolted the forward ends of the handles B, which are bent outward and then rearward, and their rear parts are connected and held in proper relative positions by a round, C. The handles B are strengthened in position and supported at the proper height by braces D, the rear ends of which are attached to the ends of the round C, and their forward ends are bolted to the opposite sides of the beam A at the upper part of its bend. The handles B, a little in the rear of their rearward bends, are connected by a round, E, to the ends of which are attached the upper parts of the standards F. In bearings in the lower ends of the standards F revolves the axle G, which is kept from longitudinal movement by collars or shoulders attached to or formed upon the said axle.

To the ends of the axle G are rigidly attached wheels H, the faces of which are corrugated or otherwise roughened, to cause them to take a better hold upon the ground.

Several holes are formed in the upper parts of the standards F to receive the ends of the round E, so that the handles B and beam A can be readily adjusted higher or lower, to regulate the depth at which the machine works in the ground.

Upon the middle part of the axle G rests the forward part of the screen or clearer, which is formed of a series of parallel bars, I, placed longitudinally with the machine, and at such a distance apart that the potatoes cannot pass between them, while the soil can pass through freely. The bars I have holes in their rear and forward ends to receive the rods J K, and are kept at the proper distance apart by tubular washers placed upon the said rods J K between the said bars I. The rear rod, J, is slightly curved to prevent the potatoes from falling off at the sides of the clearer. The forward rod, K, is more deeply curved than the rear rod, J, to adapt the forward end of the clearer to receive the potatoes and soil from the scoop, hereinafter described. The middle part of the forward rod, K, passes through a hole in the beam A at a little distance from its lower end, and through lugs $b$, formed upon or attached to the scoop N, so as to hinge the clearer at its forward end to the said beam.

To the ends of the forward rod, K, are attached the rear ends of the braces L, the forward ends of which are bolted to the opposite sides of the forward part of the beam A.

To the ends of the rod K are also attached the upper ends of the bars M, the lower ends of which have holes formed through them to receive the axle G, so as to hold the said axle to its place.

N is the scoop, which is made pointed to cause it to enter the soil easily, and is concaved longitudinally, so that it will deliver upon the clearer I J K all the potatoes and soil raised by it. Upon the lower side of the rear middle part of the scoop N is formed, or to it is attached, a socket or keeper, O, to receive and fit upon the lower end of the beam A, where it is secured in place by the set-screw P, passing through the said keeper and resting against the said beam.

Upon the middle part of the axle G are formed three (more or less) wings, Q, which, as the said axle G revolves, successively raise and lower the clearer, so as to shake out all the soil received with the potatoes from the scoop N. The potatoes fall from the rear end of the clearer to the ground.

To the beam A, a little in front of its bend, is attached the upper end of the standard R, which may be made tubular, semi-tubular, or solid, and has a point or shoe formed upon its lower end to adapt it to open the hills in advance of the scoop N, and cause the said scoop to enter and pass through the ground more easily. The draft-strain upon the standard R is sustained by the rod S, the lower end of which passes through the standard R, and is secured in place by a head or nut and a washer. The upper end of the rod S passes through the bend of the U-bar T, and has a nut screwed upon it. The ends of the U-bar T are bolted to the opposite sides of the beam A.

Upon the rod S is placed a conical roller, U, apex downward, and which has a flange, V, around its upper end or base, as shown in Fig. 2, so that the said roller will turn the potato-stalks, weeds, and other rubbish to one side, and thus prevent them from clogging the machine.

To the lower side of the beam A, at a little distance from its forward end, is bolted, riveted, or otherwise secured the hook W, upon which is hooked an eye formed upon the rear end of the draft-rod X. The forward end of the draft-rod X is jointed to the shank of the draft-hook Y, which shank passes through a hole in the lower end of the hanger Z. The hanger Z passes up through a hole in the forward end of the beam A, and is secured in place by a set screw, $a$, so that by loosening the said set-screw and sliding the said hanger up or down the point of draft attachment will be raised or lowered to adjust the point of draft attachment and cause the scoop N to work deeper or shallower in the ground, as may be required.

Having thus described my invention, I claim as new and desire to secure by Letters Patent—

1. In a potato-digger, the combination, with the beam and the scoop connected to its rear downwardly and inwardly curved end, of the clearer, with its forward curved bar supported in the lower end of the beam and in lugs on the rear bottom portion of the scoop, and connected to the divergent ends of bars fastened at their convergent ends to the beam, and the clearer-vibrating cams or wings on the axle of supporting-wheels, substantially as and for the purpose set forth.

2. In a potato-digger, the combination of the beam, the scoop, the curved clearer supported at its forward end in the lower end of the beam and in lugs on the rear bottom edge of the scoop, and connected to the divergent ends of bars fastened to the beam, the handles, with their right-angled portions connected to the beam, and the axle having the clearer-vibrating cams and the axle-supporting bars connected to the forward bar of the clearer and to the handles, substantially as and for the purpose set forth.

HANS NELSON.

Witnesses:
O. H. ROWE,
N. L. NELSON.